(12) United States Patent
Gualtieri (10) Patent No.: US 7,888,950 B2
(45) Date of Patent: Feb. 15, 2011

(54) STRUCTURAL HEALTH MONITORING SENSOR SYSTEM AND METHOD USING RESONANT TRANSMISSION LINE SENSORS

(75) Inventor: Devlin M. Gualtieri, Ledgewood, NJ (US)

(73) Assignee: Honeywell International Inc., Morristown, NJ (US)

( * ) Notice: Subject to any disclaimer, the term of this patent is extended or adjusted under 35 U.S.C. 154(b) by 152 days.

(21) Appl. No.: 11/774,081

(22) Filed: Jul. 6, 2007

(65) Prior Publication Data

US 2009/0009188 A1   Jan. 8, 2009

(51) Int. Cl.
*G01H 1/00* (2006.01)
(52) U.S. Cl. .................. 324/633; 73/579; 73/583
(58) Field of Classification Search .......... 324/633; 73/579–583
See application file for complete search history.

(56) References Cited

U.S. PATENT DOCUMENTS

| | | | |
|---|---|---|---|
| 4,821,769 A * | 4/1989 | Mills et al. ............ 137/554 |
| 6,445,191 B1 * | 9/2002 | Trummer ............... 324/635 |
| 6,505,509 B2 * | 1/2003 | Gualtieri ............... 73/290 V |
| 7,092,840 B2 | 8/2006 | Gualtieri | |
| 7,180,404 B2 * | 2/2007 | Kunerth et al. ......... 340/10.41 |
| 2001/0005134 A1 * | 6/2001 | Friedel et al. ........... 324/225 |
| 2005/0192774 A1 * | 9/2005 | Gualtieri ................. 702/150 |

* cited by examiner

*Primary Examiner*—Timothy J Dole
*Assistant Examiner*—Farhana Hoque
(74) *Attorney, Agent, or Firm*—Ingrassia Fisher & Lorenz, P.C.

(57) ABSTRACT

A structural health monitoring system and method uses a resonant transmission line sensor. A resonant transmission line sensor, which includes one or more sensor conductors and a dielectric material disposed at least proximate the one or more sensor conductors, is coupled to the structure. The dielectric material exhibits a dielectric constant that varies when at least a portion of the transmission line sensor is subjected to one or more stimuli. One or more resonant frequencies of the transmission line sensor are determined, and the determined one or more resonant frequencies are then correlated to the structural health of the structure.

9 Claims, 6 Drawing Sheets

STRUCTURAL HEALTH MONITORING SENSOR SYSTEM AND METHOD USING RESONANT TRANSMISSION LINE SENSORS

TECHNICAL FIELD

The present invention generally relates to resonant transmission line sensors and, more particularly, to resonant transmission line sensors for structural health monitoring.

BACKGROUND

Structural health monitoring is becoming of ever-increasing significance for many industries. One industry for which this is becoming especially significant is the aerospace industry. This is because, among other things, the structural integrity of systems and components in the aerospace industry can possibly cause in-flight shutdowns, take-off aborts, delays, or cancellations, all of which can result in significant industry and consumer costs.

Some structural health monitoring systems rely on system models to predict future structural performance and to detect likely structural faults. One limitation with these systems is that the models may not be sufficiently accurate to adequately account for all variables that can affect structural health. As a result, these systems reduce the ability to adequately monitor structural health.

Hence, there is a need for a system and method of physically monitoring the structural health of one or more systems or components, without relying on potentially inaccurate models. The present invention addresses at least this need.

BRIEF SUMMARY

In one embodiment, a structural health monitoring sensor system includes a variable frequency signal source, a transmission line sensor, a summing circuit, and a monitor circuit. The variable frequency signal source is operable to supply one or more sensor drive signals at one or more frequencies. The transmission line sensor has one or more resonant frequencies, and includes one or more sensor conductors and a dielectric material disposed at least proximate to one or more sensor conductors. The transmission line sensor has a driven end coupled to receive the one or more sensor drive signals and a terminal end configured to reflect the one or more sensor drive signals to thereby supply one or more reflected signals to the driven end. The dielectric material exhibits a dielectric constant that varies when at least a portion of the transmission line sensor is subjected to one or more stimuli. A summing circuit is coupled to receive the one or more sensor drive signals and the one or more reflected signals and is operable, in response thereto, to supply one or more standing wave signals having amplitudes that vary with the one or more resonant frequencies of the transmission line sensor. The monitor circuit is coupled to receive the one or more standing wave signals and is operable, in response thereto, to determine one or more resonant frequencies of the transmission line sensor.

In another embodiment, a method of monitoring structural health of a structure includes coupling a resonant transmission line sensor to the structure. The transmission line sensor includes one or more sensor conductors and a dielectric material disposed at least proximate to one or more sensor conductors. The dielectric material exhibits a dielectric constant that varies when at least a portion of the transmission line sensor is subjected to one or more stimuli. One or more resonant frequencies of the transmission line sensor are determined, and the determined one or more resonant frequencies are correlated to the structural health of the structure.

Other desirable features and characteristics of the structural health monitoring sensor system and method will become apparent from the subsequent detailed description and the appended claims, taken in conjunction with the accompanying drawings.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. Furthermore, there is no intention to be bound by any theory presented in the preceding background or the following detailed description. In this regard, it is to be appreciated that the described embodiments are not limited to use in conjunction with a particular structure and/or in a particular environment.

Figure 1:
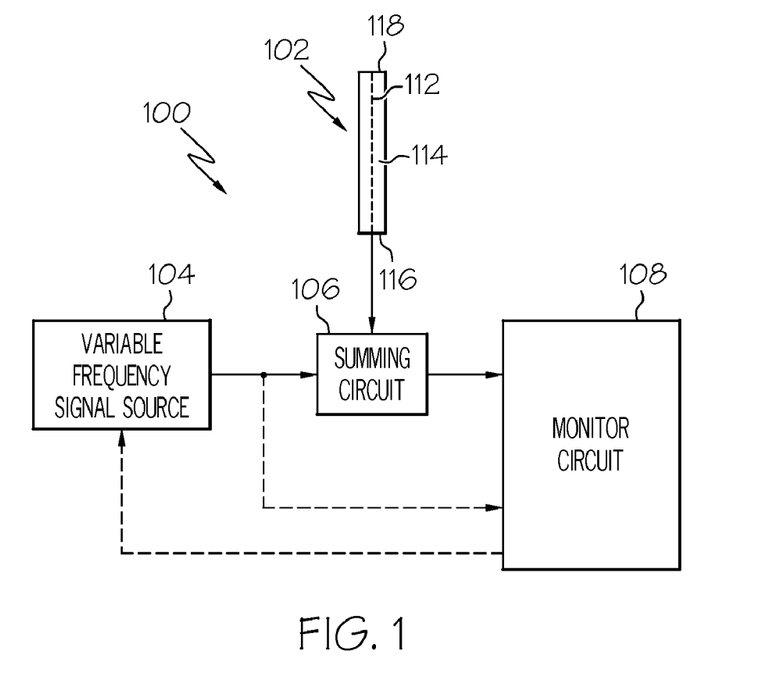
FIG. 1 depicts a functional schematic block diagram of one embodiment of a structural health monitoring sensor system.

Turning now to FIG. 1, a functional schematic block diagram of one embodiment of a structural health monitoring sensor system is shown. The system 100 includes a sensor 102, a variable frequency signal source 104, a summing circuit 106, and a monitor circuit 108. The sensor 102 is a resonant transmission line that includes one or more conductors 112 and a dielectric 114. Before proceeding further it is noted that the dielectric 114 may be separate from a particular structure that the system 100 is monitoring, or the dielectric 114 may be the particular structure (or part of the structure) that the system 100 is monitoring.

Figure 2:
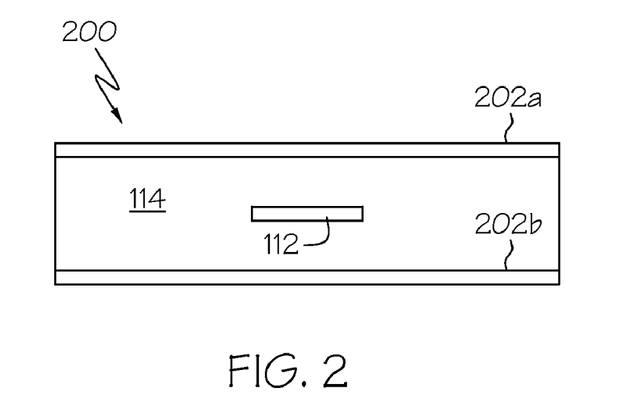
FIGS. 2 and 3 depict schematic representations of an exemplary embedded stripline transmission line and an exemplary twin line transmission line, respectively, that may be used in the system of FIG. 1.
Figure 3:
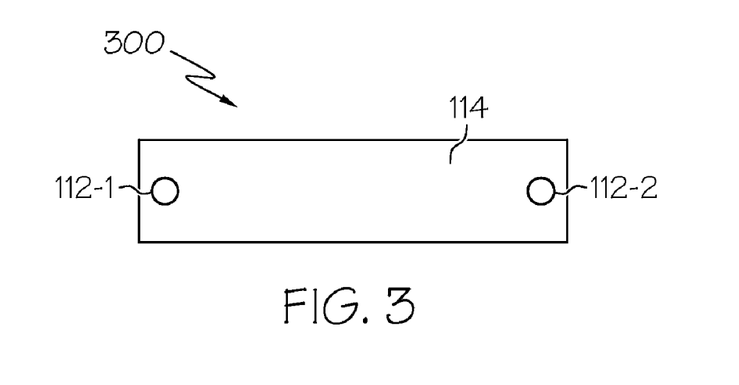

The sensor 102 may be any one of numerous types of resonant transmission lines including, for example, a coaxial transmission line, a twin lead transmission line, and an embedded stripline transmission line. No matter the particular type of transmission line that is used, the sensor 102 includes a driven end 116 and a terminal end 118. As will be described more fully below, the driven end 116 is coupled to receive a sensor drive signal from the variable frequency source 104, and the terminal end 118 reflects the sensor drive signal back toward the driven end 116, producing a standing wave signal voltage at the driven end 116. A schematic representation of an exemplary embedded stripline transmission line 200 and an exemplary twin line transmission line 300 are depicted in FIGS. 2 and 3, respectively, and for completeness will now each be briefly described.

An embedded stripline transmission line 200 includes a single conductor 112, the dielectric 114, and a pair of ground planes 202a, 202b. The conductor 112 is embedded in, or adjacent, the dielectric 114. The dielectric 114 in turn is disposed between the ground planes 202a, 202b, which shield the conductor 112 from stray signals. A twin line transmission line 300 includes a pair of conductors 112 (e.g., 112-1, 112-2) and the dielectric 114. The conductors 112 are embedded in, or adjacent, the dielectric 112, and are additionally spaced apart from one another. Unlike the embedded stripline transmission line 200, no ground planes are used because any electric field resulting from radio frequency excitation is generally contained between the conductors 112, so radiated power is minimal.

Figure 4:
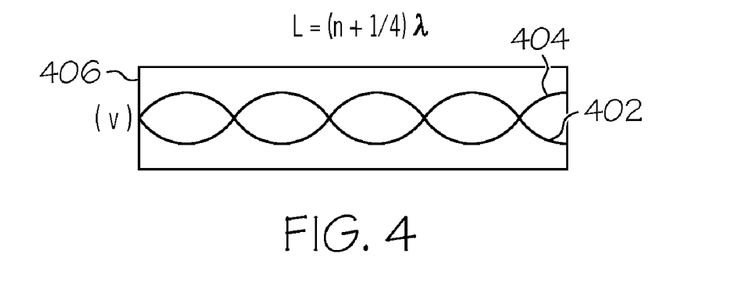
FIG. 4 is a simplified schematic representation of an exemplary resonant transmission line showing incident and reflected waves when the electrical length of the transmission line is an (n+¼)-multiple of the wavelength of the incident wave.
Figure 5:
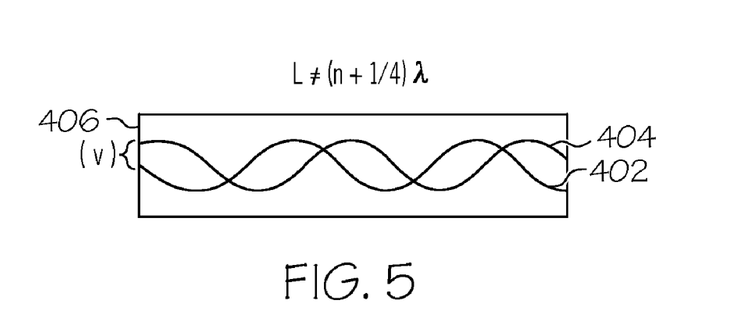
FIG. 5 is a simplified schematic representation of an exemplary resonant transmission line showing incident and reflected waves when the electrical length of the transmission line is not an (n+¼)-multiple of the wavelength of the incident wave.

As is generally known, the characteristic impedance (Z) of a transmission line depends on various factors, including the physical length of the transmission line and the dielectric constant of the dielectric 114. Moreover, whenever a transmission line, such as the transmission lines 200, 300 described above, is terminated in an impedance that does not match its characteristic impedance, the transmission line will reflect an incident signal that has been injected into it. If the incident signal is a continuous signal, such as a radio frequency (RF) signal, the incident and reflected signals mix, producing what is known as a standing wave signal. As shown in FIG. 4, and as is generally known, when the physical length or the electrical length (L) of a transmission line 200, 300 is an $(n+¼)$ multiple of the wavelength ($\lambda$) of the incident signal, the incident 402 and reflected 404 signals destructively interfere at the driven end 406 of the transmission line 200, 300 and the standing wave signal voltage (V) is substantially zero at the driven end 406. Conversely, as shown in FIG. 5, whenever the physical length or the electrical length (L) varies from an $(n+¼)$ wavelength multiple, the incident 402 and reflected 404 signals do not fully destructively interfere, and a non-zero standing wave signal voltage (V) is present at the driven end 406. When the former situation exists, that is the physical length or the electrical length (L) of the transmission line 200, 300 is an $(n+¼)$ multiple of the wavelength ($\lambda$) of the incident signal, the frequency of the incident signal matches the resonant frequency of the transmission line 200, 300.

Figure 6A:
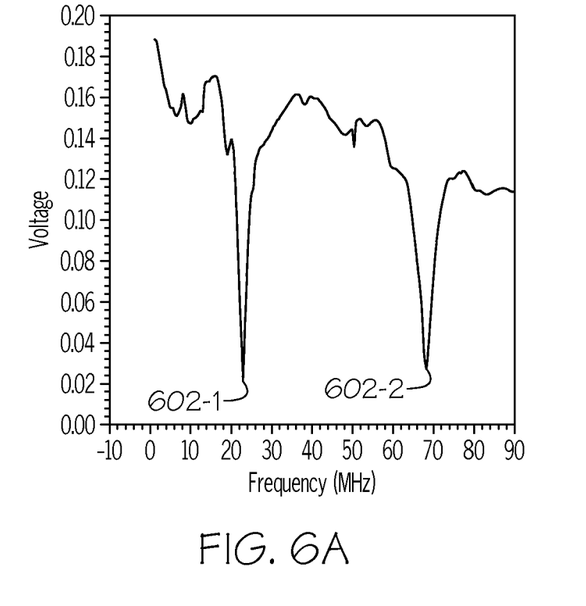
FIGS. 6A and 6B are graphs depicting exemplary standing wave responses in the frequency domain for an embedded transmission line and a twin lead transmission line respectively.
Figure 6B:
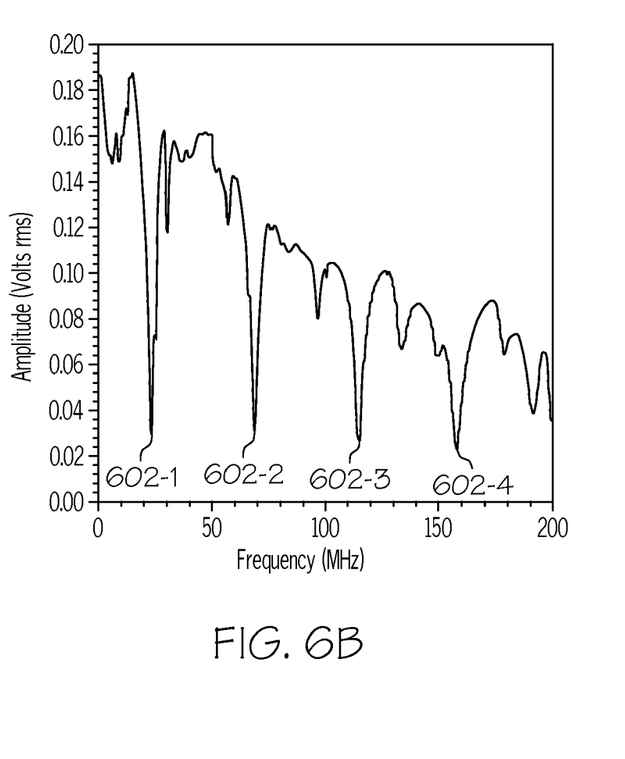

The standing wave signal voltage (V) versus transmission line physical or electrical length (L) is known as the standing wave response of a transmission line. The standing wave response may be depicted in either the time domain, such as shown in FIGS. 4 and 5, or in the frequency domain. A standing wave response in the frequency domain for an exemplary embedded stripline transmission line 200 is illustrated in FIG. 6A, and a standing wave response in the frequency domain for an exemplary twin line transmission line 300 is illustrated in FIG. 6B. Each of these responses shows two or more nodes 602-1, 602-2, 602-3, 602-4 occurring at the resonant frequencies of the transmission line. The first of these so-called node frequencies 602-1 coincides with the principle resonant frequency of the transmission line, whereas the subsequent nodes 602-2, 602-3, 602-4 coincide with multiples of the transmission line resonant frequency.

From the foregoing it may be appreciated that if the physical length or the dielectric constant of a transmission line 200, 300 is varied by, for example, subjecting the transmission line to one or more stimuli, then the resonant frequency of the transmission line 200, 300 will vary accordingly. Hence, a transmission line 200, 300 including a dielectric 114 constructed of a material having a dielectric constant that varies when subjected to one or more mechanical stimuli can be used as a mechanical state sensor. Moreover, a transmission line 200, 300 that varies in physical length (L), such as by stretching, shrinkage, or breakage, as a result of being subjected to one or more mechanical stimuli, can be used as a mechanical state sensor. The mechanical stimuli to which the transmission line 200, 300 and/or dielectric 114 may be subjected may vary and include, but are not limited to, material stress, strain, and structural integrity.

The above-described transmission lines 200, 300 may also be used to sense various environmental condition variations. As may be appreciated, various environmental conditions may reflect the prognosis for the long-term structural health of a structure. For example, exposure of the structure to water or other potentially corrosive fluid for an extended period can indicate the possibility of corrosion. For completeness, a brief description of the sensitivity of a transmission line 200, 300 to environmental condition variations will now be provided.

The resonance of a radio frequency transmission line occurs at the following condition:

$$\lambda = [(\kappa_o + \kappa_m)/(n+¼)]L,$$

where $\lambda$ is the resonant wavelength, $\kappa_o$ is the effective dielectric constant of the transmission line 200, 300 in air (including any supporting structure for the transmission line), $\kappa_m$ is the average dielectric constant of the medium surrounding the transmission line 200, 300, n is an integer specifying the mode number, and L is the physical length of the transmission line 200, 300. The resonance frequency (F) is a function of the wavelength $\lambda$ and the speed of light c, or more specifically:

$$F = c/\lambda.$$

From the previous two equations, it may thus be seen that:

$$F = c(n+¼)/[(\kappa_o + \kappa_m)L].$$

The $\kappa_m$ parameter is proportional to the fractional change (E) of the environmental condition being sensed. Or, more specifically:

$$\kappa_m = \kappa_a E,$$

where $\kappa_a$ is the dielectric constant at the fully-sensed environmental condition. From this it may be seen that:

$$F = c(n+¼)/[(\kappa_o + \kappa_a E)L].$$

Now, solving for E leads to:

$$(\kappa_o + \kappa_a E)L = c(n+¼)/F,$$

$$(\kappa_o + \kappa_a E) = c(n+¼)/FL,$$

$$E = [c(n+¼)/\kappa_a FL] - [\kappa_o/\kappa_a].$$

This equation may be simplified as follows:

$$E = [C_1/F] - C_2,$$

where $C_1$ and $C_2$ are constants for a specific resonance node n.

From the above it may thus be seen that a sensed environmental condition E is a simple function of (1/F). In practice, the resonant frequency varies over a range of only 10% of the base frequency, so that E closely follows a linear function of F. It will be appreciated that the environmental condition variations to which the transmission line 200, 300 may be subjected may vary and include, but are not limited to, variations in temperature, chemical exposure, and radiation exposure.

Returning now to the description, it will be appreciated that the dielectric 114 may be any one of numerous dielectric materials that exhibit dielectric constant variations when subjected to one or more mechanical and/or environmental stimuli. Preferably, the dielectric characteristics are such that the sensor 102 will exhibit sufficient variations in reflection characteristics to an injected signal when the dielectric 114 is subjected to one or more mechanical stimuli of interest. Examples of dielectric materials that could be used include, without limitation, barium titanate, strontium barium titanate, lead zirconium titanate, aluminum oxide, silicon dioxide, nylon, polystyrene, and Teflon. Composite materials, such as particles of strontium barium titanate in a polymer matrix, can be used also. Moreover, as was noted above, the dielectric 114 may be constructed as part of the transmission line sensor 102, or may be the structure (or part of the structure) that is being monitored by the system 100. In either instance, the sensor 102 may be disposed on, or embedded in, the structure being monitored.

Referring once again to FIG. 1, the variable frequency source 104 is configured to generate and supply one or more radio frequency (RF) sensor drive signals. In one embodiment, the variable frequency source 104 is configured to generate and supply a plurality of sensor drive signals at random frequencies within a selected bandwidth. With this particular embodiment, the specific random frequencies at which the variable frequency source 104 generates and supplies the sensor drive signals may be in response to a control signal supplied from the monitor circuit 108 or other non-illustrated circuit. Alternatively, the variable frequency source 104 may be configured to randomly generate and supply the sensor drive signals at the random frequencies with no external signal.

In another embodiment, the variable frequency source 104 is configured to continuously generate and supply an RF sensor drive signal. The particular frequency at which the variable frequency source 104 supplies the sensor drive signal, is based on a control signal supplied from the control circuit 108. As will be described in more detail further below, with this embodiment the control signal supplied from the control circuit 108, and thus the particular RF frequency at which the variable frequency source 104 generates and supplies the sensor drive signal, depends on the resonant frequency of the transmission line sensor 102.

No matter the particular configuration of the variable frequency source 104, it will be appreciated that the sensor drive signal frequency supplied by the variable frequency source 104 preferably matches the resonant frequency of the transmission line sensor 102. The variable frequency source 104 may be configured to generate and supply the sensor drive signal in any one of the numerous RF frequency bands (e.g., VLF, LF, MF, HF, etc). Preferably, however, the variable frequency source 104 is configured to generate the sensor drive signal in the HF (high frequency) frequency band (e.g., 3-30 MHz) or the VHF (very high frequency) frequency band (e.g., 30-300 MHz). Lower frequencies are preferable when low signal loss in associated connecting cables is desirable, and higher frequencies are preferably when a small sensor size is desirable.

It is noted that with the first-described embodiment of the variable frequency source 104, in which sensor drive signals of random frequencies are generated and supplied, the average radiated power of the sensor drive signal at a particular frequency is reduced relative to the continuously generated sensor drive signal of the second-described embodiment. Moreover, any interference that the RF sensor drive signals may cause with other devices is less with the first-described embodiment.

Returning once again to the description, it may be seen that, no matter the particular variable frequency source 104 configuration that is used, the sensor drive signals are supplied to the sensor 102 via the summing circuit 106. In addition to receiving the sensor drive signals from the variable frequency source 104, the summing circuit 106 also receives reflected signals from the sensor 102. The summing circuit 106 sums the sensor drive signals and the reflected signals together and supplies standing wave signals representative of the standing wave signal voltage (V) at the sensor driven end 116 to the monitor circuit 108.

The monitor circuit 108 is configured to process the standing wave signals supplied from the summing circuit 106 to determine one or more resonant frequencies of the transmission line sensor 102. In one embodiment, the monitor circuit 108 is configured to sample the standing wave signals that are generated in response to application of sensor drive signals of random frequencies being supplied to the transmission line sensor 102. The monitor circuit 108 is further configured, in this embodiment to generate an image, or otherwise construct, the resonance spectrum (or portion thereof) of the transmission line sensor 102.

In another embodiment, the monitor circuit 108 is configured to process the standing wave signals supplied from the summing circuit 106 to determine the frequency of the sensor drive signal supplied to the sensor 102 relative to the resonant frequency of the transmission line sensor 102. Based on this determination, the control circuit 108 supplies a frequency control signal to the variable frequency source 104. In particular, as was previously mentioned for one embodiment of the variable frequency source 104, the monitor circuit 108 supplies a frequency control signal that will cause the variable frequency source 104 to supply sensor drive signals at the resonant frequency of the transmission line sensor 102. More specifically, and as will be described in more detail further below, the monitor circuit 108 determines whether the sensor drive signal is at, below, or above the resonant frequency of the resonant transmission line sensor 102, and supplies the appropriate control signal based on this determination. To do so, the control circuit 108 determines the first derivative of the amplitude of the standing wave signal with respect to frequency. With this latter embodiment, the monitor circuit 110 may additionally be coupled to receive the sensor drive signal supplied by the variable frequency source 104. If so, the monitor circuit 110 preferably processes the sensor drive signal and, based on the frequency of this signal, supplies a signal representative of the one or more stimuli to which the transmission line sensor 102 and/or dielectric 114 are subjected.

Various circuits and individual component configurations could be used to implement each of the circuit functionalities described above. Moreover, these various circuits and individual component configurations could also be configured to implement the above-described functions in any one of numerous ways. With reference now to FIGS. 7-11, particular preferred circuit configurations, and the methodologies implemented by these circuit configurations will, for completeness, now be described.

Figure 7:
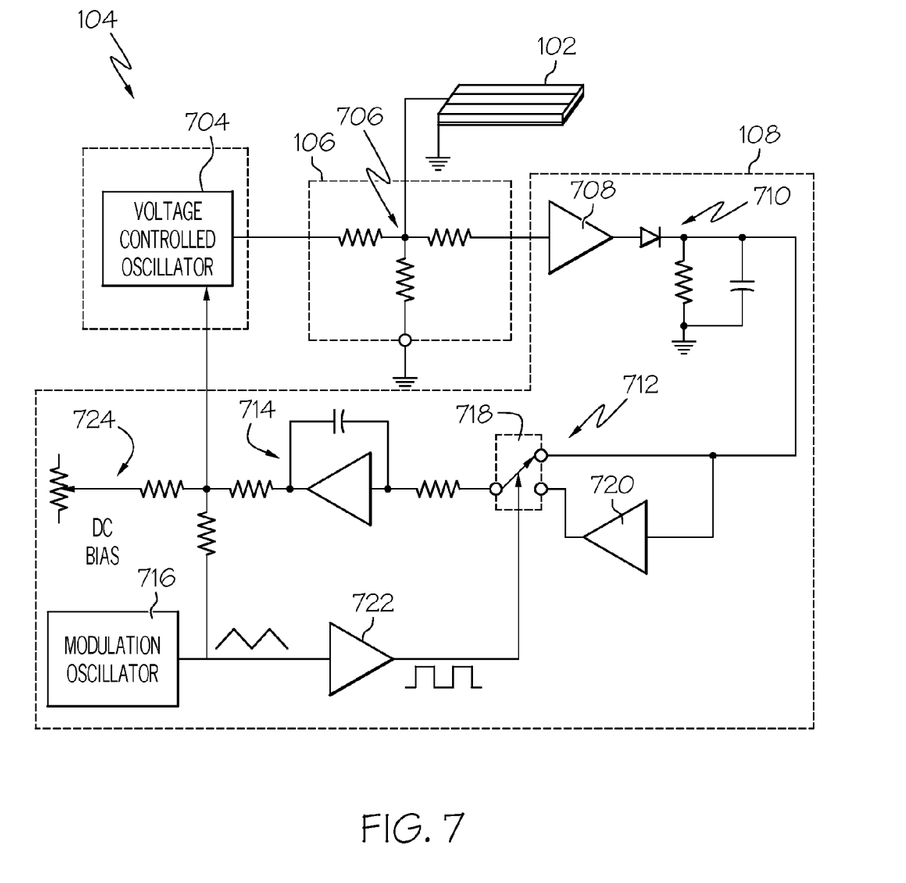
FIGS. 7 and 8 are functional block diagrams of exemplary circuit configurations that may be used to implement the system of FIG. 1.

Turning first to FIG. 7, the sensor system 100 is depicted for the embodiment in which the variable frequency source 104 is configured to supply a continuous sensor drive signal, and the monitor circuit 108 is configured to process the standing wave signals, determine the frequency of the sensor drive signal relative to the resonant frequency of the transmission line sensor, and supply a frequency control signal to the variable frequency source 104. The depicted variable frequency source 104 is implemented as a variable frequency oscillator circuit, and preferably as a voltage-controlled oscillator (VCO) circuit 704. A VCO circuit, as is generally known, generates an AC signal at a frequency that is based on a control signal supplied to the VCO circuit from an external source. In the depicted embodiment, the control signal, as was mentioned above, is supplied to the VCO circuit 704 from the control circuit 108, a particular preferred circuit configuration of which is described in more detail further below.

The summing circuit 106 is preferably implemented as a resistor "T" network 706, though it will be appreciated that it could be implemented as any one of numerous three-port summing circuit configurations. The resistor "T" network 706 sums the sensor drive signal from the VCO circuit 104 and the signal reflected in the transmission line sensor 102, producing the above-mentioned standing wave signal. In a preferred embodiment, the resistor "T" network 706 is collocated with the resonant transmission line sensor 102. This is done to make the response of the sensor 102 independent of the length of the cables interconnecting the sensor 102 to the circuitry. The resistor "T" network 706 couples the standing wave signal to the control circuit 108, which will now be described in more detail. It will be appreciated that the summing circuit 106 is preferably implemented as depicted in FIG. 6 for each of the described embodiments.

The monitor circuit 108 is implemented as a lock-in amplifier circuit, and includes an RF amplifier 708, a rectifier and low-pass filter circuit 710, a synchronous detector circuit 712, an integrator circuit 714, and a modulation oscillator circuit 716. The RF amplifier circuit 708 receives and amplifies the standing wave signal supplied from the resistor "T" network 706. The amplified standing wave signal is supplied to the rectifier and low-pass filter circuit 710, which rectifies and smoothes the standing wave signal, and supplies the rectified standing wave signal to the synchronous detector circuit 712.

In the depicted embodiment, the synchronous detector circuit 712 includes an analog switch 718, an inverter 720, and a threshold comparator circuit 722. The analog switch 718 is controlled by a square wave signal supplied from the comparator circuit 722. The comparator circuit 722 is coupled to the modulation oscillator circuit 716, which generates and supplies a modulation signal, preferably in the audio frequency range. The comparator circuit 722, in response to the modulation signal, supplies a switch control signal at the same frequency as the modulation signal frequency. Thus, the position of the analog switch 718 is switched at the modulation signal frequency, and supplies a phase-detected signal to the integrator circuit 714.

The integrator circuit 714 receives the phase-detected signal from the synchronous detector circuit 712, and integrates this signal to produce a phase-detected control signal. The phase-detected control signal is summed with the modulation signal supplied from the modulation oscillator circuit 716, to supply the frequency control signal to the VCO circuit 704. The control circuit 108 may additionally include a bias voltage supply circuit 724. The bias voltage supply circuit 724, if included, supplies a DC bias voltage, which is additionally summed with the phase-detected control signal and the modulation signal, to produce the frequency control signal that is supplied to the VCO circuit 704.

It was previously mentioned that the monitor circuit 108, for at least this particular implementation, determines the first derivative of the amplitude of the standing wave signal with respect to sensor drive signal frequency, and that this determination is used to supply the appropriate frequency control signal to the variable frequency source 104. This is accomplished by frequency modulating the sensor drive signal supplied by the variable frequency source 104, and synchronously detecting the amplitude of the standing wave signal supplied from the summing circuit. In the above-described circuit implementation, the modulation signal supplied by modulation oscillator circuit 716 is used to frequency modulate the sensor drive signal. Because the frequency modulation alternates between increasing and decreasing the sensor drive signal frequency, the standing wave signal from the resonant transmission line sensor 102 is not only similarly frequency modulated, it is also amplitude modulated.

Figure 9:
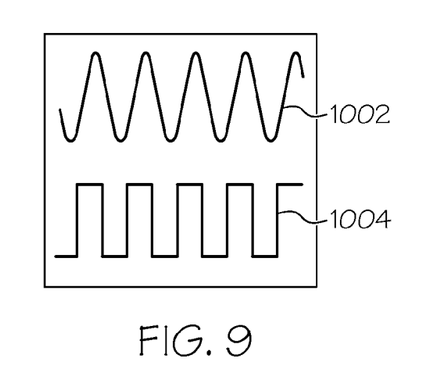
FIGS. 9 and 10 depict signals within the circuit configuration of FIG. 7.
Figure 10:
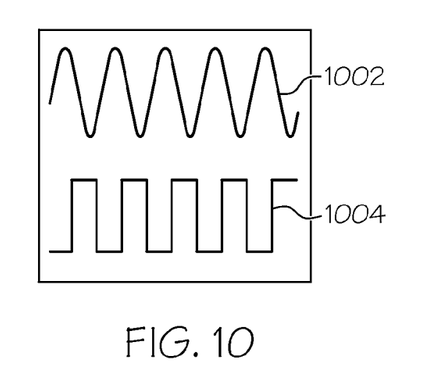

The synchronous detector circuit 712, in combination with the RF amplifier 708, and the low-pass filter circuit 710, synchronously detects the standing wave signal amplitude in phase with the frequency modulation, to produce the phase-detected signal. If the phase-detected signal is in phase with the frequency modulation, which means the amplitude and frequency modulation of the standing wave signal are in phase, then the sensor drive signal frequency is greater than the resonant frequency of the resonant transmission sensor 102 (e.g., the first derivative of the amplitude of the standing wave signal with respect to frequency is positive). This instance is illustrated in FIG. 9, which shows the phase-detected signal 1002 in phase with the switch control signal 1004 supplied from the comparator circuit 722. Conversely, if the phase-detected signal is 180-degrees out of phase with the frequency modulation, which means the amplitude and frequency modulation of the standing wave signal are 180-degrees out of phase, then the sensor drive signal frequency is less than the resonant frequency of the resonant transmission sensor 102 (e.g., the first derivative of the amplitude of the standing wave signal with respect to frequency is negative). This instance is illustrated in FIG. 10, which shows the phase-detected signal 1002 180-degrees out of phase with the switch control signal 1004.

It should be understood that it is the polarity of the phase-detected control signal that is output by the integrator circuit 714 that indicates whether the sensor drive signal frequency greater than or less than the resonant frequency of the resonant transmission line sensor 102. Specifically, if the phase-detected control signal is a positive voltage, then the sensor drive signal frequency is greater than the resonant frequency the resonant transmission line sensor 102. Conversely, if the phase-detected control signal is a negative voltage, then the sensor drive signal frequency is less than the resonant frequency of the resonant transmission line sensor 102. In either case, the phase-detected control signal is added to the modulation signal to generate an appropriate frequency control signal that is then supplied to the variable frequency source 104, to bring the sensor drive signal frequency to the resonant frequency of the resonant transmission line sensor 102.

Before describing a further function that may be implemented by the monitor circuit 108, a brief description of the operation of the just-described specific circuit implementations of the variable frequency source 104 and the monitor circuit 108 will first be described. In doing so, reference should be made to FIG. 11, which depicts a portion of the standing wave response 1102, in the frequency domain, of the resonant transmission line sensor 102 near a resonant frequency 1104.

Figure 11:
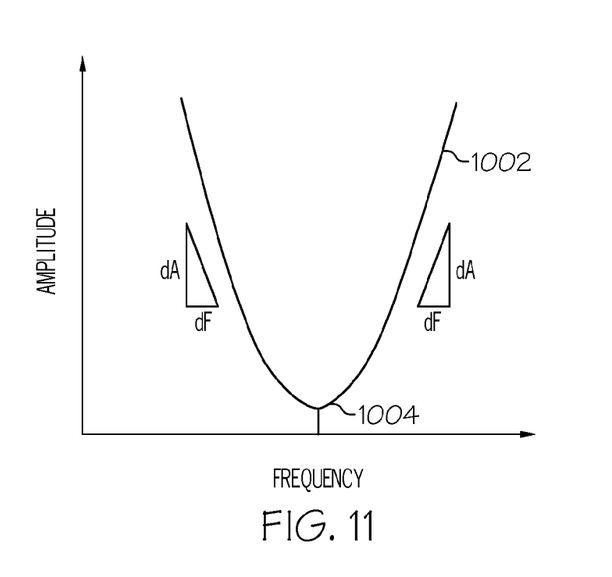
FIG. 11 is a portion of an exemplary resonant transmission line standing wave response in the frequency domain near a resonance node.

As shown in FIG. 11, if the monitor circuit 108 determines that the frequency of the sensor drive signal is below the resonant frequency 1104, the synchronous detector circuit 712, integrator circuit 714, and modulation oscillator 716 produce a frequency control signal that causes the VCO circuit 704 to increase the frequency of the sensor drive signal to the resonant frequency 1104. Conversely, if the control circuit 108 determines that the frequency of the sensor drive signal is above the resonant frequency 1104, the synchronous detector circuit 712, integrator circuit 714, and modulation oscillator 716 produce a frequency control signal that causes the VCO circuit 704 to decrease the frequency of the sensor drive signal to the resonant frequency 1104.

Figure 8:
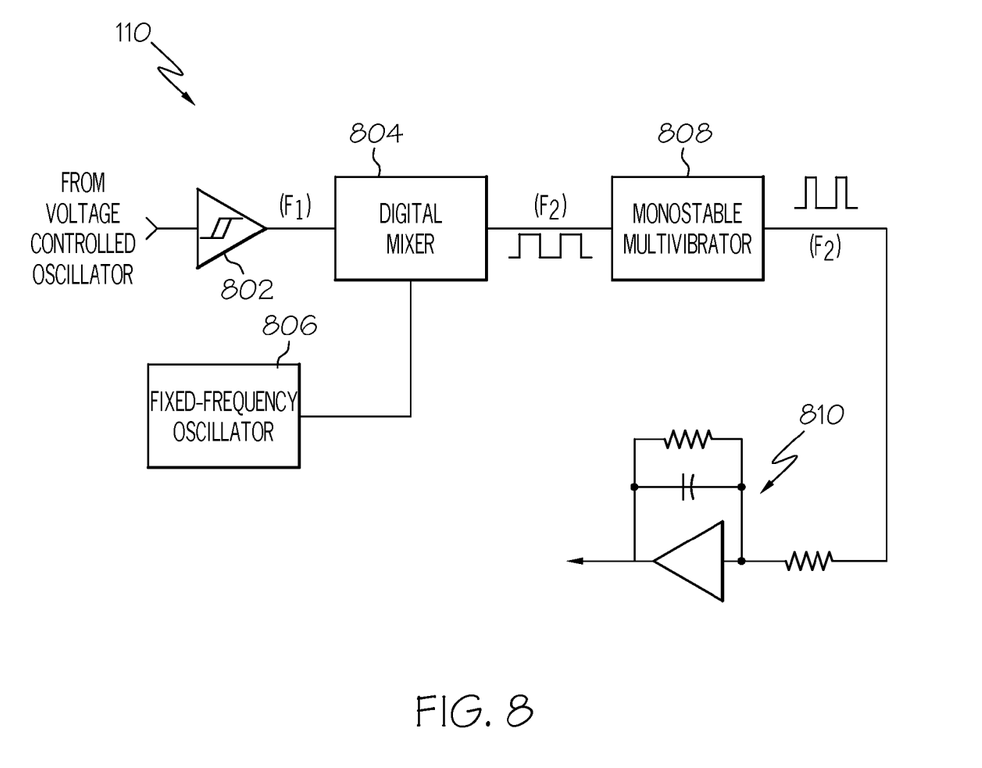

As was previously noted the monitor circuit 108 may additionally be configured, in at least some embodiments, to process the sensor drive signal and, based on the frequency of this signal, supply a signal representative of the one or more stimuli to which the transmission line sensor 102 and/or dielectric 114 are subjected. In one embodiment, the monitor circuit 110 includes a frequency-to-voltage converter circuit to implement this functionality. As is generally known, a frequency-to-voltage converter circuit converts an AC signal to a DC signal having a voltage magnitude that is proportional to the frequency of the AC signal. Although various circuit configurations could be used to implement this particular preferred function, in the particular preferred implementation, which is shown in FIG. 8, the monitor circuit 108 includes a Schmitt trigger circuit 802, a digital mixer circuit 804, a fixed-frequency oscillator circuit 806, a monostable multivibrator circuit 808, and a signal averaging circuit 810.

The Schmitt trigger circuit 802 receives the sensor drive signal from the VCO circuit 704, and converts it to a square wave signal having a frequency ($F_1$) that matches the sensor drive signal frequency. The digital mixer 804 receives the square wave signal and a fixed-frequency signal supplied by the fixed-frequency oscillator 806, and heterodynes (or mixes) the two signals to convert the square wave signal to a heterodyned signal having a lower frequency ($F_2$). The heterodyned signal is then supplied to the monostable vibrator circuit 808, which supplies a fixed pulse-width signal at the frequency of the heterodyned signal ($F_2$). The signal averaging circuit 801 receives and averages the fixed pulse-width signal, and supplies a DC position signal having a voltage magnitude that is proportional to the heterodyned signal frequency ($F_2$).

The resonant frequency of the resonant transmission line sensor 102, as was noted above, varies with its physical length, the dielectric constant of the dielectric 114, and the surrounding environment. Thus, by coupling the transmission line sensor 102 to a structure, the system 100 can be used to supply signals representative of variations in transmission line sensor 102 physical length that result from the structure being subjected to one or more mechanical stimuli and/or variations in the dielectric constant of the dielectric 114 that result from the structure being subjected to one or more mechanical stimuli and/or that result from the structure being subjected to one or more environmental stimuli. These variations can be used to monitor, and prognosticate regarding, the overall structural health of the structure.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method of monitoring structural health of a structure, comprising the steps of:
    coupling a resonant transmission line sensor to the structure, the transmission line sensor including one or more sensor conductors and a dielectric material disposed at least proximate the one or more sensor conductors, the dielectric material exhibiting a dielectric constant that varies when at least a portion of the dielectric material is subjected to one or more stimuli;
    supplying a drive signal to the resonant transmission line sensor to thereby produce a reflected signal;
    summing the reflected signal and the sensor drive signal to produce a standing wave signal;
    processing the standing wave signal to determine one or more resonant frequencies of the transmission line sensor; and
    correlating the determined one or more resonant frequencies to the structural health of the structure to which the resonant transmission line sensor is coupled.

2. The method of claim 1, further comprising:
    supplying one or more sensor drive signals at one or more frequencies to the resonant transmission line sensor.

3. The method of claim 2, wherein the resonant transmission line sensor is configured, upon receipt of the one or more sensor drive signals, to supply one or more reflected signals, and wherein the method further comprises:
    determining the one or more resonant frequencies of the transmission line sensor in part from the one or more reflected signals.

4. The method of claim 1, wherein the one or more stimuli include variations in one or more mechanical states.

5. The method of claim 4, wherein the one or more mechanical states include one or more of stress, strain, and structural integrity.

6. The method of claim 1, wherein the one or more stimuli include variations of an environmental condition.

7. The method of claim 6, wherein the environmental condition includes one or more of temperature, chemical exposure, and radiation exposure.

8. The method of claim 1, wherein the one or more stimuli is a variation in mechanical state, a variation of an environmental condition, or both.

9. The method of claim 8 wherein:
    the mechanical state includes one or more of stress, strain, and structural integrity; and
    the environmental condition includes one or more of temperature, chemical exposure, and radiation exposure.

* * * * *